(12) United States Patent
Higuma et al.

(10) Patent No.: US 7,773,833 B2
(45) Date of Patent: Aug. 10, 2010

(54) OPTICAL MODULATION DEVICE

(75) Inventors: Kaoru Higuma, Chiyoda-ku (JP); Toshio Sakane, Chiyoda-ku (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 12/297,558

(22) PCT Filed: Apr. 19, 2007

(86) PCT No.: PCT/JP2007/058522
§ 371 (c)(1),
(2), (4) Date: Oct. 17, 2008

(87) PCT Pub. No.: WO2007/123175
PCT Pub. Date: Nov. 1, 2007

(65) Prior Publication Data
US 2009/0097795 A1    Apr. 16, 2009

(30) Foreign Application Priority Data
Apr. 20, 2006 (JP) .............................. 2006-116630

(51) Int. Cl.
*G02F 1/01* (2006.01)
*G02F 1/035* (2006.01)
*G02B 6/10* (2006.01)

(52) U.S. Cl. ................... 385/3; 385/1; 385/2; 385/129; 385/130; 385/132

(58) Field of Classification Search .................. 385/1–3, 385/129–130, 132
See application file for complete search history.

(56) References Cited

U.S. PATENT DOCUMENTS

| 6,456,351 B1 | 9/2002 | Kim et al. |
| 6,469,765 B1 | 10/2002 | Matsuyama et al. |
| 6,600,542 B2 | 7/2003 | Kim et al. |
| 6,603,526 B2 | 8/2003 | Kim et al. |

(Continued)

FOREIGN PATENT DOCUMENTS

EP    1 335 509    8/2003

(Continued)

OTHER PUBLICATIONS

Kawanishi et al. "High Carrier Suppression Double Sideband Modulation Using an Integrated LiNbO$_3$ Optical Modulator." *Microwave Photonics*. 2005. pp. 29-32.

(Continued)

*Primary Examiner*—Mark A Robinson
*Assistant Examiner*—Erin D Chiem
(74) *Attorney, Agent, or Firm*—Merchant & Gould P.C.

(57) ABSTRACT

Light having components of frequencies $f_0$, $f_{+1}$ and $f_{-1}$ outputted from an optical modulator (10) is monitored, a second light detection means (14b) measures the power P2 of all the components, and a first light detection means (14a) measures the power P1 with frequency $f_0$ component cut out by a filter means (13). Based on these light receiving powers (P1) and (P2), phase differences imparted by the respective DC electrodes of Mach-Zehnder optical waveguides (MZ-A, MZ-B, MZ-C) of the optical modulator (10) are controlled. The control is performed to minimize the light receiving power (P1) and to maximize the light receiving power (P2).

6 Claims, 6 Drawing Sheets

U.S. PATENT DOCUMENTS

| | | |
|---|---|---|
| 6,646,707 B2 | 11/2003 | Noh et al. |
| 6,816,222 B2 | 11/2004 | Ono et al. |
| 7,136,130 B2 | 11/2006 | Ono et al. |
| 7,295,268 B2 | 11/2007 | Ono et al. |
| 7,345,728 B2 | 3/2008 | Lee et al. |
| 2003/0147577 A1 | 8/2003 | Kataoka et al. |
| 2008/0074602 A1 | 3/2008 | Arai et al. |

FOREIGN PATENT DOCUMENTS

| | | |
|---|---|---|
| JP | A-2000-029072 | 1/2000 |
| JP | A-2000-356786 | 12/2000 |
| JP | A-2002-182230 | 6/2002 |
| JP | 2003-234703 | 8/2003 |
| JP | A 2003-280017 | 10/2003 |
| JP | A 2005-107535 | 4/2005 |
| JP | 2005-134897 | 5/2005 |
| JP | 2005-215196 | 8/2005 |
| JP | A-2008/83386 | 4/2008 |
| KR | A 2002-0063498 | 8/2002 |
| KR | A 2002-0085237 | 11/2002 |
| KR | A 2003-0053562 | 7/2003 |
| KR | A 2005-0030462 | 3/2005 |
| KR | A 2006-0007520 | 1/2006 |
| KR | A 2006-0071677 | 6/2006 |

OTHER PUBLICATIONS

Kawanishi et al. "High Extinction Ratio Optical Modulator Using Active Intensity Trimmers." *ECOC.* vol. I. 2005. pp. 25-29.

Natatogawa et al. "Optical single sideband modulator for distribution of digital broadcasting signals on millimeter-wave band based on self heterodyne." *Electronics Letters.* vol. 40. No. 21. 2004. pp. 1369-1370.

Kawanishi et al. "Generation of double sideband radio-on-fiber signal with large carrier suppression ratio." *Proceedings of the 2005 IEICE Electronics Society Conference.* 2005. pp. 61-62.

Higuma et al. "Wavelength dependence of high extinction-ratio LN modulator using an optical FSK modulator." *Conference Jr. of Institute of Electronic, Information, Comm. Engineers Society.* 2005. 5 pages.

OPTICAL MODULATION DEVICE

TECHNICAL FIELD

The present invention relates to an optical modulation device, and particularly to the optical modulation device capable of realizing a high extinction ratio of an ON state to an OFF state of intensity modulation.

This application is a National Stage Application of PCT/JP2007/058522, filed 19 Apr. 2007, which claims benefit of Ser. No. 2006-116630, filed 20 Apr. 2006 in Japan and which applications are incorporated herein by reference. To the extent appropriate, a claim of priority is made to each of the above disclosed applications.

BACKGROUND ART

In an optical communication system transmitting signals by sending a beam through an optical fiber, there has been used a beam intensity modulator capable of generating optical signals by modulating a laser beam emitted from a light source. The beam intensity modulator is formed by forming a Mach-Zehnder type optical waveguide, modulation electrodes, bias electrodes, and the like on a board made of electro-optic crystal such as lithium niobate ($LiNbO_3$, hereinafter, abbreviated to LN).

The Mach-Zehnder type optical waveguide includes a division portion dividing an input beam, two arms permitting propagating the divided beams, and a beam combining portion combining the divided beams propagating through the arms. In the beam combining portion, when two merging beams are in-phase, the beam waves constitute an ON state in which the beam waves are output while intensifying each other. In contrast, when the two merging beams are out-phase, the beam waves constitute an OFF state in which the beam waves compensate for each other so that no light is output, A ratio of the intensity of the output beam in the ON state to the intensity of the output beam in the OFF state is called an extinction ratio and is an important index which shows a performance of the beam intensity modulator. In addition, as the extinction ration is higher, that is, as a difference between the intensities of the output beams in the ON state and the OFF state is larger, a modulation degree generally becomes larger. Accordingly, optical transmission of high quality is permitted.

Ideally, when output is zero in the OFF state, the extinction ratio becomes indefinite. However, in order to cause this situation, the intensities of the two merging beams have to be exactly equal to each other. However, the intensities of the merging beams may become asymmetric one another since a division ratio of the division portion is not the same due to a manufacture error of the optical waveguide or propagation loss in the two arms is different. In this case, there occurs a problem in that the extinction ratio deteriorates. That is because the two beams do not completely compensate for each other even though the two beams are out-phase.

As a method of making tee intensities of the beams symmetric in the beam collection portion to improve the extinction ratio, for example, a method of applying an excimer laser to the arm having a larger division power and permitting a defect in the optical waveguide to increase the propagation loss and balance with the intensity of the beam propagating trough the other arm can be taken into consideration. However, this method also has a problem in that the propagation loss made by permitting the defect depends on a wavelength and the extinction ratio also depends on a wavelength.

There is disclosed a light FSK (Frequency Shift Keying) modulator in which sub-Mach-Zehnder optical waveguides are each provided in two arms of a main Mach-Zehnder optical waveguide and in which an RF modulation process is performed in the sub-Mach-Zehnder optical waveguides to generate sideband beams (sidebands on the upper and lower sides) in the upper and lower portions of a frequency and a phase is selected in association with a data signal in the main Mach-Zehnder optical waveguide to output the sideband beams as signal beams subjected to a frequency modulation process by switching the sidebands to the upper and lower sides to output (for example, see Patent Document 1). In addition, there has recently been suggested a beam intensity modulator capable of realizing a high extinction ratio by using the sub-Mach-Zehnder optical waveguides as a light quantity adjusting unit and operating the light FSK modulator as the above-described beam intensity modulator (for example, see Non-patent Document 1).

Patent Document 1: Unexamined Japanese Patent Application, First Publication No. 2005-134897

Non-patent Document 1: Hikuma et al. "Wavelength Property of High Extinction Ratio Modulator to which Light FSK Modulator is Applied in 2005 Conference Journal of Institute of Electronic, Information, Communication Engineers Society, September 2005, c-3-2"

DISCLOSURE OF INVENTION

Problems to be Solved by the Invention

In the beam intensity modulator disclosed in Non-patent Document 1, an intensity of an output beam of the beam intensity modulator is just monitored when the light quantity of the sub-Mach-Zehnder optical waveguide is adjusted. In this case, adjusting the light quantity cannot be performed on the basis of the intensity of the monitored beam when a modulation process is performed simultaneously in the main Mach-Zehnder optical waveguide. Accordingly, since the adjusting of the light quantity has to be performed in a state where the modulation process is not performed (that is, before the beam intensity modulator actually operates), there occurs a problem in that a high extinction ratio cannot be realized and maintained in real time in order to respond to circumstance variation, for example.

Moreover, if a light spectrum is monitored instead of the intensity of the output beam, the adjusting of the light quantity is possible. However, the adjusting of the light quantity has to be performed while the spectrum is checked with the naked eye. Accordingly, it is difficult to automate the beam intensity modulator.

The invention was made in view of the above-described problems, and an object of the invention is to provide an optical modulation device capable of reliably obtaining a high extinction ratio while performing a modulation process by modulation signals.

Means for Solving the Problem

The present invention was made to solve the above-described problems, and provides an optical modulation device including: an optical modulation unit in which first and second sub-Mach-Zehnder optical waveguides are formed in two arms of a main Mach-Zehnder optical waveguide supplied with a beam having a component of frequency $f_0$, and in which a first phase difference adjusting member adjusts an intensity of respective output beams passing through the sub-Mach-Zehnder optical waveguides by applying a phase difference to the beam passing through both arms of at least one of the sub-Mach-Zehnder optical waveguides, a second phase difference adjusting member applies a phase difference of a bias to the respective beams passing through the two arms of the main Mach-Zehnder optical waveguide, and a modulation member modulates a frequency of the beam into a modulation frequency $f_m$ to output a beam having a component of frequency $f_{+1}=f_0+f_m$ and a component of frequency $f_{-1}=f_0-f_m$ from the main Mach-Zehnder optical waveguide; a division unit which divides the output beam of the optical modulation unit into two beams; a filter unit which extracts the component of frequency $f_0$ from one divided beam; a first optical detector which measures a beam reception power of the filtered beam having the component of frequency $f_0$; and a second optical detector which measures a beam reception power of the other divided beam having the components of frequencies $f_0$, $f_{+1}$, and $f_{-1}$. In the optical modulation unit, the first and second phase difference adjusting members are controlled so that the beam reception power measured by the first optical detector becomes a minimum value and the beam reception power measured by the second optical detector becomes a maximum value.

According to the above-described invention, the output beam having the components of frequencies $f_0$, $f_{+1}$, and $f_{-1}$ subjected the modulation process is output from the optical modulation unit, the beam reception power of the beam having the component of frequency $f_0$ and the beam reception power of the beam having the entire frequencies are each measured, and the phase difference adjusting members of the optical modulation unit are controlled on the basis of the two beam reception powers. Accordingly, it is possible to reliably optimize the extinction ratio while performing the modulation process. In addition, since the controlling of the phase difference adjusting members is performed so that the component of frequency $f_0$ becomes a minimum value, the intensities of the output beams passing through the two sub-Mach-Zehnder optical waveguides become equal with high precision. That is, a high extinction ratio is realized. In addition, since the power of the signal component (the frequencies $f_{+1}$ and $f_{-1}$) is controlled to become a maximum value, an output efficiency of the optical modulation unit is improved.

In the above-described optical modulation device, the first phase difference adjusting member allows the phase difference of the beam having a stronger intensity and passing through the both arms of the sub-Mach-Zehnder optical waveguide to be different to attenuate the intensity of the beam, so that the intensities of the output beams passing through the two sub-Mach-Zehnder optical waveguides become equal to each other.

According to the above-described invention, the intensities of the output beams passing through the two sub-Mach-Zehnder optical waveguides become equal to each other. Accordingly, it is possible to realize the high extinction ratio. In addition, since the beam having the stronger intensity is attenuated, a beam loss can be suppressed as much as possible and the large output of the optical modulation unit can be realized as much as possible.

In the above-described optical modulation device, the second phase difference adjusting member may adjust the beam passing through the two arms of the main Mach-Zehnder optical waveguide so that the phase difference between the beams is $\pi$.

According to the above-described invention, it is possible to control the output beams which have the intensities asymmetric to each other and pass through the two sub-Mach-Zehnder optical waveguides so that the component of frequency $f_0$ becomes the minimum value corresponding to the intensities of the beam. Accordingly, it is possible to realize the high extinction ratio.

The above-described optical modulation device may be configured such that the optical modulation unit sequentially performs: a first step of setting the beam reception powers of the first and second optical detectors to be a maximum value together; a second step of controlling the second phase difference adjusting member so that the beam reception power of the first optical detector becomes a minimum value; and a third step of controlling the first phase difference adjusting member so that the beam reception power of the first optical detector more decreases.

According to the above-described invention, the controlling of the phase difference adjusting members can be performed to obtain the high extinction ratio without divergence of the control result. Moreover, it is possible to perform an automatic control process in accordance with the above-described steps.

In the above-described optical modulation device, the Mach-Zehnder optical waveguides may be configured by an optical waveguides formed on a board having an electro-optical effect, and the first and second phase difference adjusting members and the modulation member may be configured by electrodes applying an electric field to the Mach-Zehnder optical waveguides.

According to the above-described invention, the optical modulation unit can be configured as an element of an optical waveguide manufactured by a semiconductor process.

The present invention provides an optical modulation device including: an optical modulation unit in which first and second sub-Mach-Zehnder optical waveguides formed in two arms of a main Mach-Zehnder optical waveguide supplied with a beam having a component of frequency $f_0$, and in which a first phase difference adjusting member adjusts an intensity of respective output beams passing through the sub-Mach-Zehnder optical waveguides by applying a phase difference to the beam passing through both arms of at least one of the sub-Mach-Zehnder optical waveguides, a second phase difference adjusting member applies the phase difference of a bias to the beam passing through the two arms of the main Mach-Zehnder optical waveguide, and a modulation member modulates a frequency of the beam into a modulation frequency $f_m$ to output a beam having a component of frequency $f_{+1}=f_0+f_m$ and a component of frequency $f_{-1}=f_0-f_m$ from the main Mach-Zehnder optical waveguide; a division unit which divides the output beam of the optical modulation unit into a beam having the component of frequency $f_0$ and a beam having the components of frequencies $f_{+1}$ and $f_{-1}$; a third optical detector which measures a beam reception power of the beam having the component of frequency $f_0$; and a fourth optical detector which measures a beam reception power of the beam having the components of frequencies $f_{+1}$ and $f_{-1}$. In the optical modulation unit, the first and second phase difference adjusting members are controlled so that the beam reception power measured by the third optical detector becomes a minimum value and the beam reception power measured by the fourth optical detector becomes a maximum value.

According to the above-described invention, the output beam having the components of frequencies $f_0$, $f_{+1}$, and $f_{-1}$ subjected the modulation process is output from the optical modulation unit, the output beam is divided into the beam having the component of frequency $f_0$ and the beam having the components of frequencies $f_{+1}$ and $f_{-1}$ to measure the beam reception powers thereof, and the phase difference adjusting members of the optical modulation unit are controlled on the basis of the two beam reception powers. Accordingly, it is possible to reliably optimize the extinction ratio while performing the modulation process. In addition, since the controlling of the phase difference adjusting members is performed so that the component of frequency $f_0$ becomes a minimum value, the intensities of the output beams passing through the two sub-Mach-Zehnder optical waveguides become equal with high precision. That is, the high extinction ratio is realized. In addition, since the power of the signal component (the frequencies $f_{+1}$ and $f_{-1}$) is controlled to become a maximum value, the output efficiency of the optical modulation unit is improved.

EFFECTS OF THE INVENTION

According to the present invention, it is possible to realize a high extinction ratio while performing a modulation process by modulation signals. In this way, an optical communication system with high quality can be structured.

FIG, 5 is a function block diagram illustrating an optical modulation device according to a second embodiment of the invention.

Figure 5:
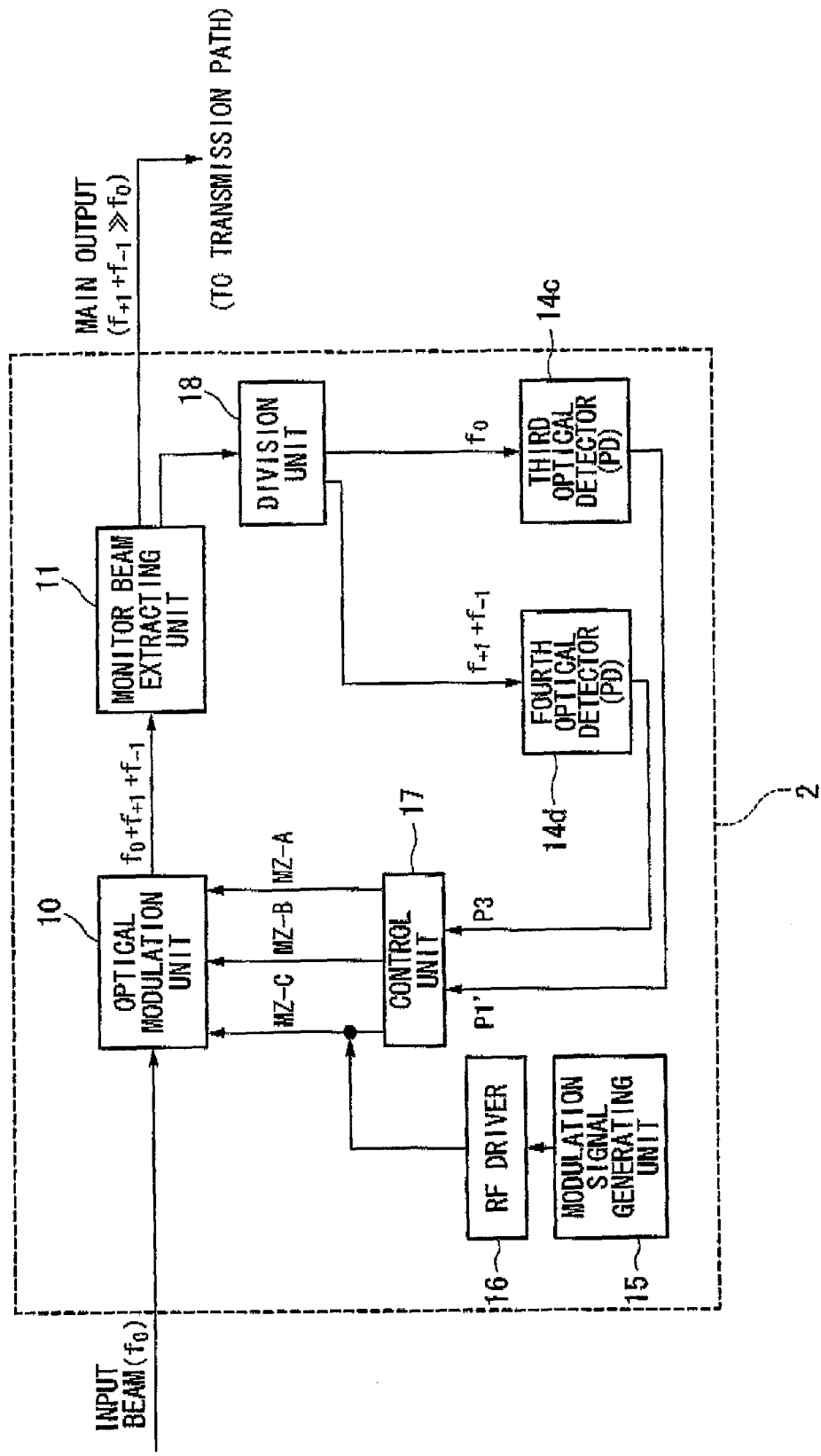
Figure 6A:
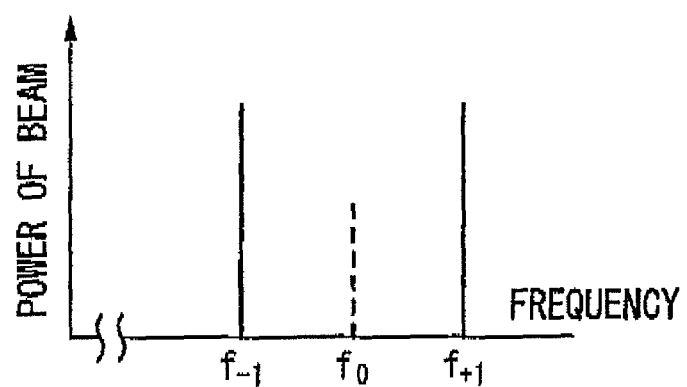

FIG. 6A is a diagram illustrating light spectrum input to a fourth optical detecting unit shown in FIG. 5.

Figure 6B:
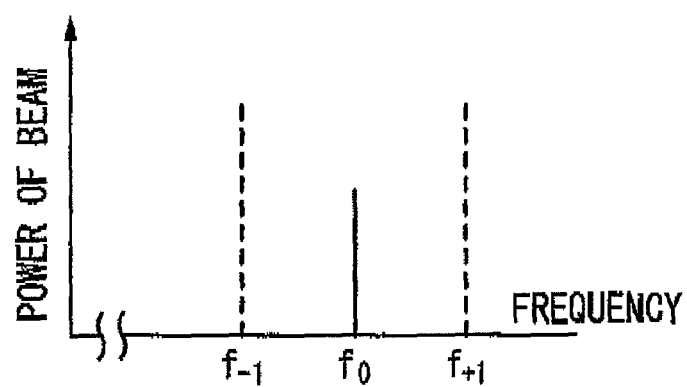

FIG. 6B is a diagram illustrating light spectrum input to a third optical detecting unit shown in FIG. 5.

DESCRIPTION OF THE REFERENCE SYMBOLS 1, 2: optical modulation device, 10: optical modulation unit 11: monitor beam extracting unit, 12: division unit, 13:, 14a: first optical detector, 14b: second optical detector, 14c: third optical detector, 14d: fourth optical detector, 15: modulation signal generating unit, 16: RF driver, 17: control unit, 18: division unit, 101: main Mach-Zehnder optical waveguide, 102: first sub-Mach-Zehnder optical waveguide, 103: second sub-Mach-Zehnder optical waveguide, 104: DC electrode, 105: modulation electrode, 106a, 106b: DC electrode, 131: optical circulator, 132: fiber bragg gratings

BEST MODE FOR CARRYING OUT THE INVENTION

Hereinafter, preferred embodiments of the invention will be described in detail with reference to the accompanying drawings.

First Embodiment

Figure 1:
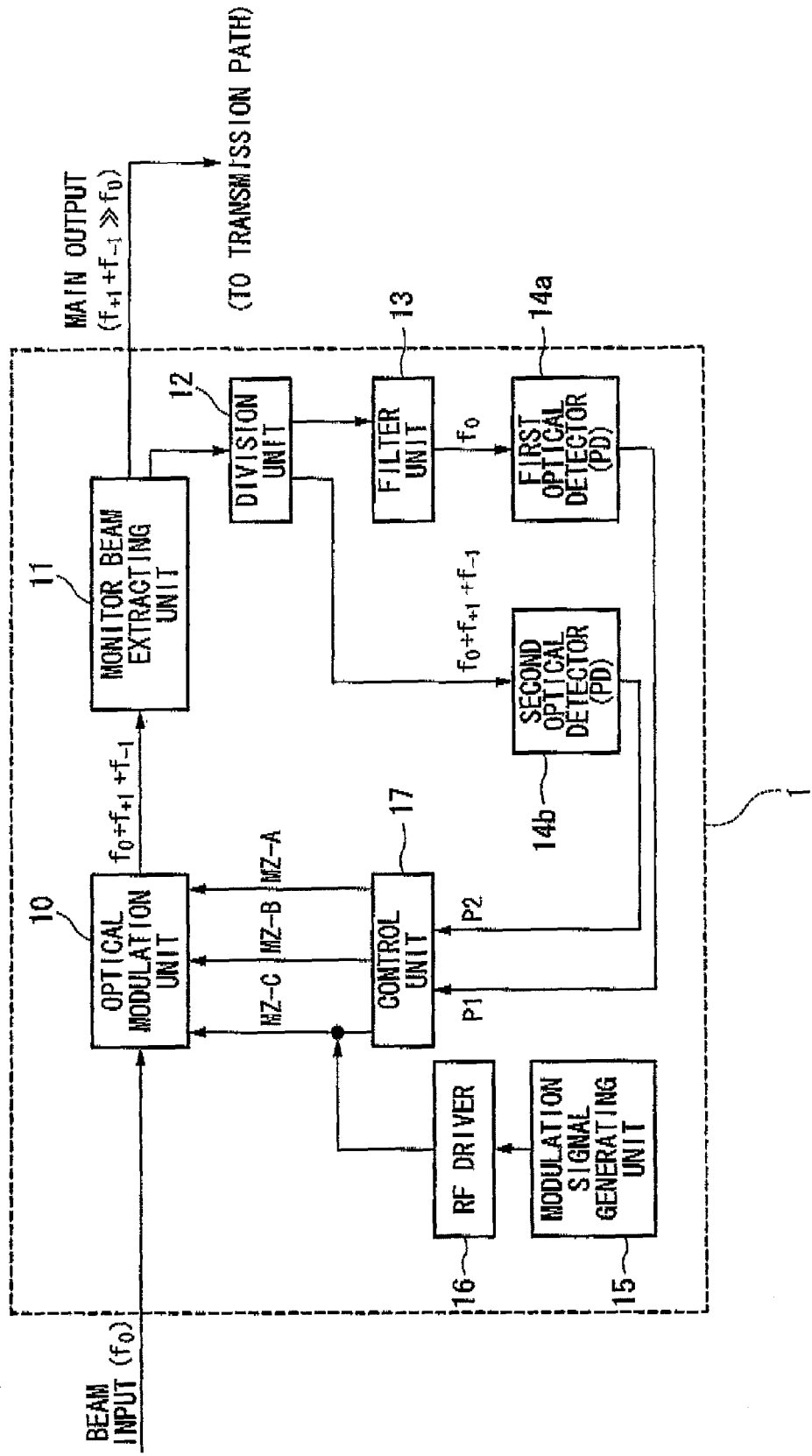
FIG. 1 is a fiction a block diagram illustrating an optical modulation device according to a first embodiment of the invention.

FIG. 1 is a functional block diagram illustrating an optical modulation device 1 according to a first embodiment of the invention.

In the figure, a laser beam having a frequency $f_0$ is emitted from a light source (not shown) to an optical modulation unit 10. The optical modulation unit 10, which includes an optical waveguide having a predetermined structure and an electrode, is an optical waveguide element (of which details are described below with reference to FIG. 2) formed of an LN board. The optical modulation unit 10 modulates an input beam into a modulation signal having a frequency $f_m$ and outputs beams having components of frequencies $f_0$, $f_{+1}$, and $f_{-1}$, where $f_{+1}=f_0+f_m$ and $f_{-1}=f_0-f_m$. In addition, when the input beam is modulated into a beam having the frequency $f_m$, a high order component $f_0+2f_m$ or $f_0+3f_m$ is generated. However, in the embodiments, the high order component is ignored for simple description.

The output beam passing through a monitor beam extracting unit 11 is output as a main output beam from the optical modulation device 1 to be transmitted through a transmission medium (optical fiber). At this time, a part of the output beam is extracted as a monitor beam used to control the optical modulation unit 10 by the monitor beam extracting unit 11, and then is supplied to a division unit 12. The monitor beam extracting unit 11 is formed of fiber type optical coupler. For example, a division ratio of the monitor beam is configured to −10 dB (main output beam: monitor beam=10:1).

The beam supplied to the division unit 12 is divided into two beams by the division unit 12. One of the divided beams is input to a first optical detector 14a via the filter unit 13 and the other of the divided beams is just input to a second optical detector 14b.

The division unit 12 is a fiber type optical coupler which is the same as the monitor optical extracting unit 11. In order for the first optical detector 14a to precisely detect a small quantity of beam having a component of frequency $f_0$, it is preferable to set the division ratio to −10 dB in the second optical detector 14b, for example, as described below.

The filter unit 13 extracts the component of frequency $f_0$ from the components of frequencies ($f_0$, $f_{+1}$, and $f_{-1}$) of the input beam to output it to the first optical detector 14a.

Figure 3:
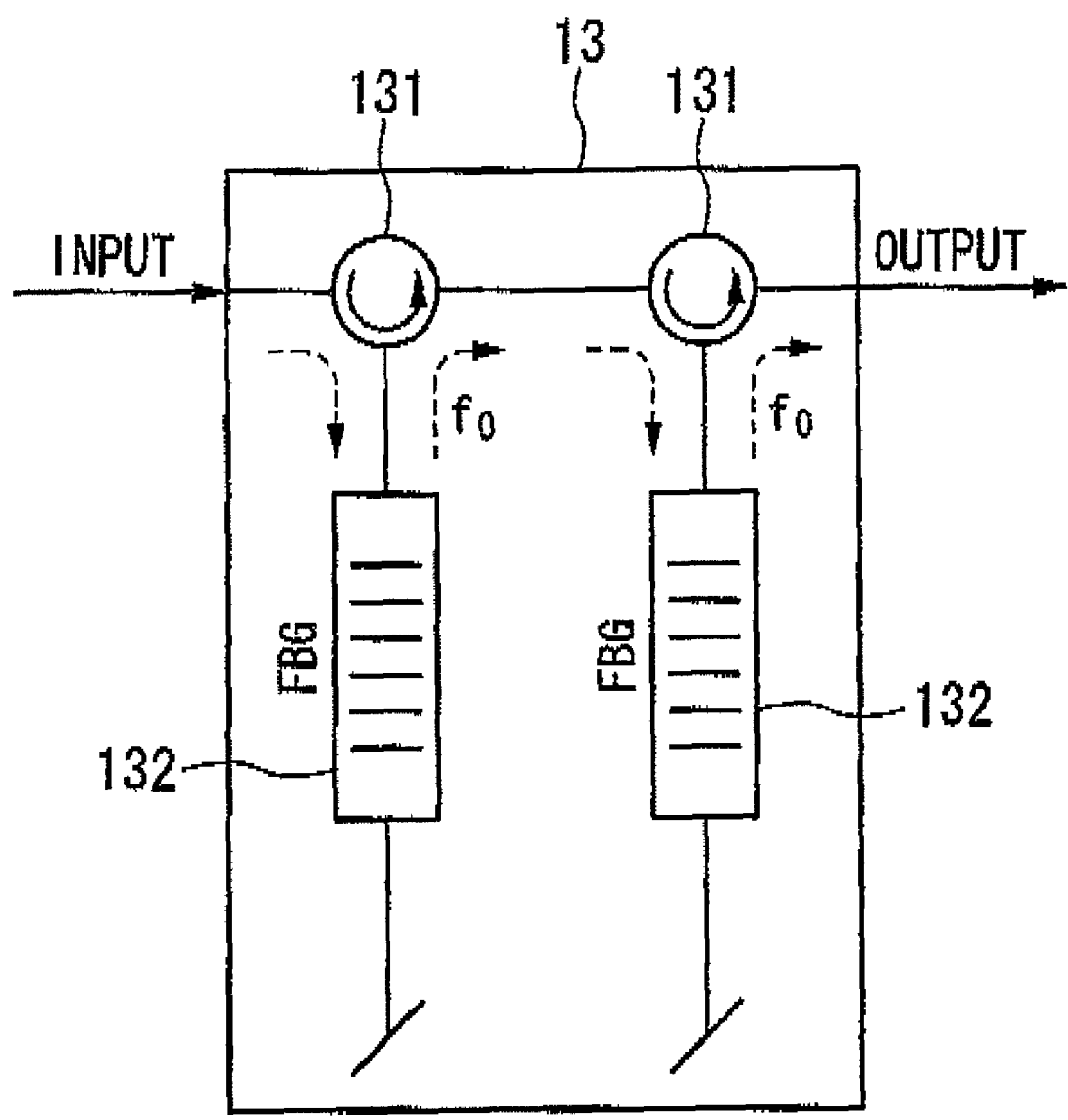
FIG. 3 is a diagram illustrating an inner configuration of a filter unit.

FIG. 3 is a diagram illustrating a specific configuration example of the filter unit 13. The filter unit 13 has a configuration in which two pairs of optical circulators 131 and fiber bragg gratings (FBG) 132 are connected in series to each other.

The beam input to the filter unit 13 is sent to a front-side fiber brag grating 132 via a front-side optical circulator 131 (where the optical circulators 131 are optical elements which output a beam in a direction indicated by an arrow in a circle in the figure). The fiber bragg gratings 132 are optical elements in which a diffraction grating having a predetermined pitch is formed and reflect only a beam having a wavelength (frequency) corresponding to the pitch. In this case, it is assumed that the fiber bragg gratings 132 selectively reflecting the beam having the component of frequency $f_0$ are used (in both the front-side and rear-side). The beam having the frequency $f_0$ reflected by the front-side fiber bragg grating 132 is sent to the rear-side optical circulator 131 via the front-side optical circulator 131.

Likewise, in the rear-side fiber bragg grating, the beam having the component of frequency $f_0$ is selectively reflected in the same manner. In this way, the beam having only the frequency $f_0$ is output from the filter unit 13.

In the filter unit 13, two pairs of fiber bragg gratings having the same filter function are connected in series to each other. In this way, by configuring multi-pairs of fiber bragg gratings, it is possible to select a frequency of the filtered beam more precisely, thereby improving control precision, which will be described below.

In the filter unit 13 using the fiber bragg gratings 132, it is preferable to perform a reflection-free termination treatment on rear portions (lower portion in the figure) of the fiber bragg gratings 132 in order to prevent the beam having the components of frequencies $f_{+1}$ and $f_{-1}$ transmitting through the fiber bragg gratings 132 from reflecting from a forward path and being mixed with the output beam of the filter unit.

Generally, upon selecting the wavelength of the fiber bragg gratings 132, a selection property depends on a temperature. Accordingly, it is preferable to put the filter unit 13 in a constant-temperature bath to maintain its temperature.

Figure 4A:
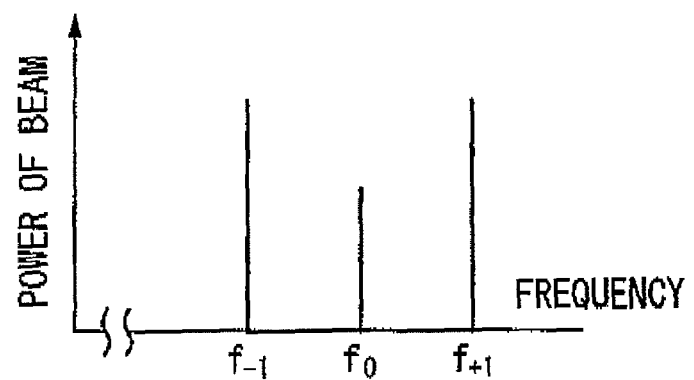
FIG. 4A is a diagram illustrating light spectrum input to a second optical detecting unit shown in FIG. 1.
Figure 4B:
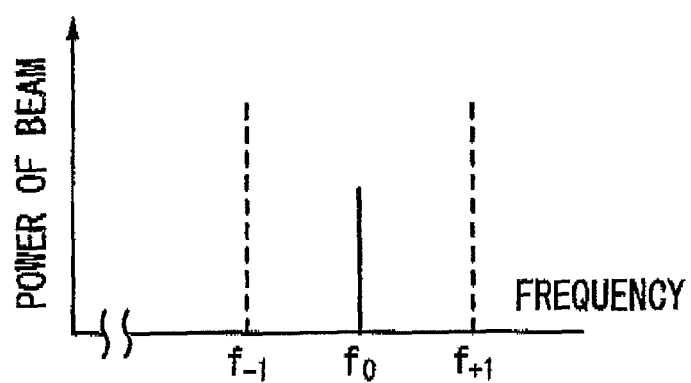
FIG. 4B is a diagram illustrating light spectrum input to a first optical detecting unit shown in FIG. 1.

In FIG. 1, the beam output from the filter unit 13 is input to the first optical detector 14a to measure a power P1 of the component of frequency $f_0$. The remainder of the beam divided from the division unit 12 is input to the second optical detector 14b to measure a power P2 including the entire components of frequencies $f_0$, $f_{+1}$, and $f_{-1}$. Spectra of the beams input to the optical detectors are shown in FIGS. 4A and 4B. The beam reception powers P1 and P2 correspond to powers of spectrum components indicated by solid lines in the figure.

The first optical detector 14a and the second optical detector 14b are formed of a photo diode (PD) detecting a power (intensity) of the received beam. The beam reception powers P1 and P2 are sent from the optical detectors to a control unit 17.

The control unit 17 controls a modulation process of the optical modulation unit 10 on the basis of the beam reception powers P1 and P2. As described below the controlling are individually performed on three electrodes which are each formed in Mach-Zehnder optical waveguides (MZ-A, MZ-B, and MZ-C). In addition, the control unit 17 is realized by a personal computer or other general control devices.

A modulation signal having the frequency $f_m$ in addition to a control signal transmitted from the control unit 17 is input to the MZ-C. The modulation signal which is generated by a modulation signal generating unit 15 is a signal which is converted into voltage having a predetermined amplitude by an RF driver 16.

Figure 2:
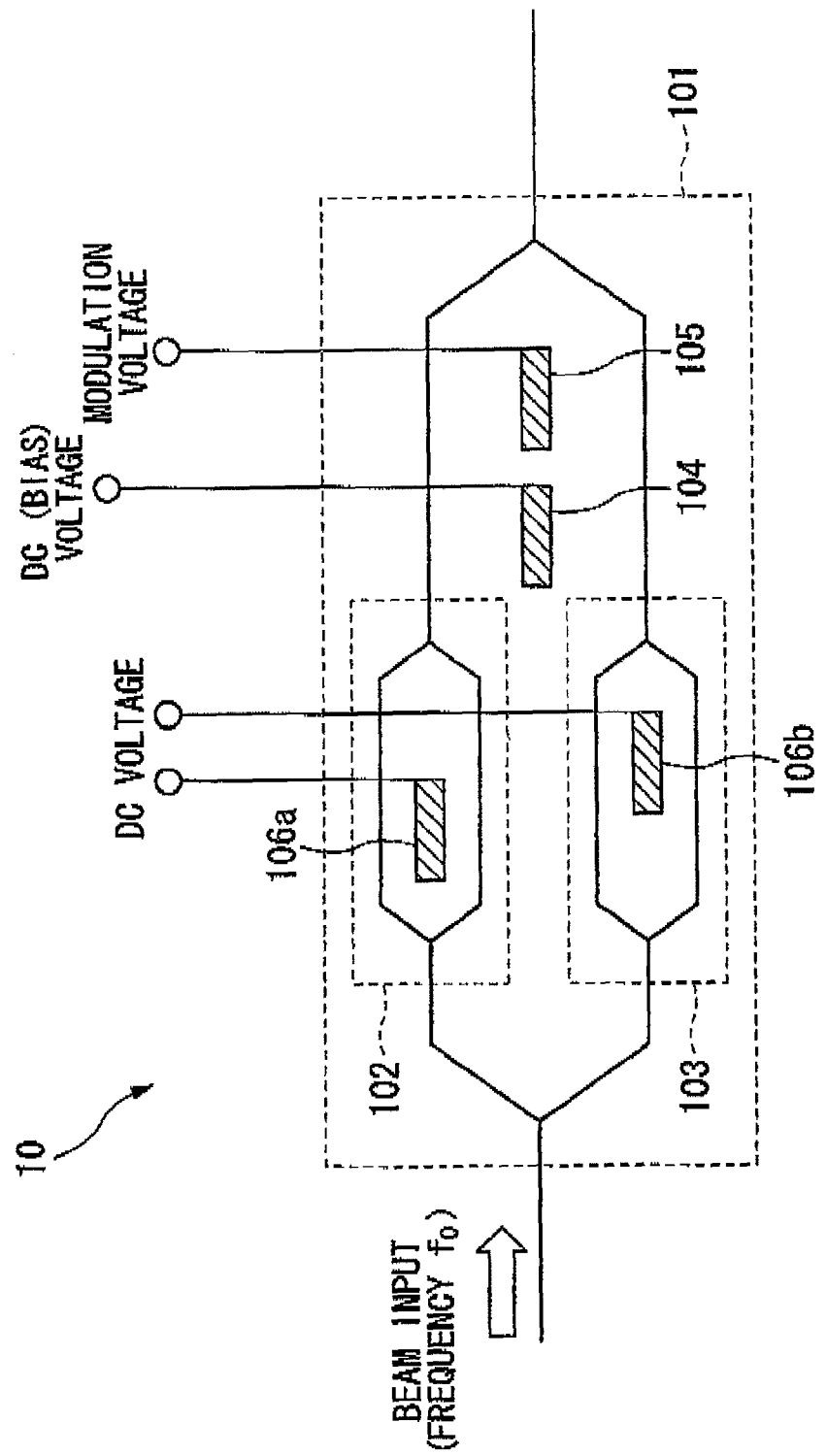
FIG. 2 is a diagram illustrating a configuration of an optical modulation unit.

Next the optical modulation unit 10 will be described with reference to FIG. 2. FIG. 2 is a diagram illustrating a configuration of the optical modulation unit 10.

In the figures the optical modulation unit 10 includes an optical waveguide constituted by a main Mach-Zehnder optical waveguide (MZ-C) 101 and a first sub-Mach-Zehnder optical waveguide (MZ-A) 102 and a second sub-Mach-Zehnder optical waveguide (MZ-B) 103 each formed in arms of the MZ-C 101. In addition, the MZ-A 102 and the MZ-B 103 are provided with DC electrode (first phase difference adjusting member) 106a and 106b which adjust a phase difference of a beam passing through respective arms of the Mach-Zehnder optical waveguides, respectively. The MZ-C 101 is provided with a DC electrode (second phase difference adjusting member) 104 which makes a phase difference of a bias on the beam passing through the arms of the Mach-Zehnder optical waveguide and a modulation electrode (modulation member) 105 which modulates a frequency of the beam into the frequency $f_m$.

Although not shown, the optical modulation unit 10 is a unit in which constituent elements are formed on the LN board made of crystal having an electro-optic effect. A phase of the beam passing though the optical waveguide varies with variation in a refractive index of the optical waveguide by an electric field applied from the respective electrodes.

By varying input voltage in the DC electrodes 106a and 106b of the MZ-A 102 and the MZ-B 103, respectively, it is possible to adjust the phase difference of the beam passing through the arms of the sub-Mach-Zehnder optical wavelengths. Accordingly, it is possible to vary the intensity of the beam output from sub-Mach-Zehnder optical wavelengths.

By varying input voltage in the DC electrode 104 of the MZ-C 101, it is possible to adjust the phase difference of the beams (beams output from the MZ-A 102 and the MZ-B 103) passing through the arms of the main Mach-Zehnder optical waveguide. Accordingly, it is possible to vary a modulation operating point of a modulation process (which is performed by the modulation electrode 105) in the main Mach-Zehnder optical waveguide.

For example, when the DC electrode 104 applies a phase difference of π, the output of the optical modulation unit 10 at none-modulation time becomes zero by interfering in the output beams of the sub-Mach-Zehnder optical wavelengths to be out-phase.

When the modulation electrode 105 modulates a frequency of the output beams into the frequency $f_m$ in this state, the sidebands occur in the frequencies $f_{+1}$ and $f_{-1}$ and the output beams are output as a modulation signal beam. However, when the intensities of the output beams of the sub-Mach-Zehnder optical wavelengths are asymmetric, the output of the optical modulation unit 10 at none-modulation time does not become zero. Moreover, even at modulation time, the output beams are output in a state where the frequency $f_0$ remains (state in FIG. 4A).

In the optical modulation device 1, the phase difference applied by the respective DC electrodes 106a, 106b, and 104 of the MZ-A 102, the MZ-B 103, and the MZ-C 101, respectively, is controlled using the beam reception powers P1 and P2 of the beams measured by the first optical detector 14a and the second optical detector 14b. In the controlling, the DC electrodes 106a, 106b, and 104 are made adjusted so that the beam reception power P1 of the first optical detector 14a becomes a minimum value and the beam reception power P2 of the second optical detector 14b becomes a maximum value.

A detail control sequence is as follows.

First, the beam reception powers P1 and P2 are set to become maximum values by adjusting the three DC electrodes 106a, 106b, and 104 (first step). At this time, in the MZ-A 102 and the MZ-B 103, the phase difference in the respective arms becomes zero and the intensities of the output beams of the sub-Mach-Zehnder optical wavelengths become the maximum value (in this case, asymmetric). In addition, in the MZ-C 101, the phase difference (the phase difference between the output beams of the sub-Mach-Zehnder optical wavelengths) in the two arms is zero.

Next, the beam reception power P1 is set to the minimum value by adjusting the DC electrode 104 of the MZ-C 101 (second step). At this time, in the MZ-C 101, the phase difference of the output beams of the sub-Mach-Zehnder optical wavelengths becomes π and the intensity of the component of frequency $f_0$ in the output beam of the optical modulation unit 10 becomes a minimum value. However, since the intensities of the output beams of the sub-Mach-Zehnder optical wavelengths remain to be asymmetric, the component of frequency $f_0$ remains and does not become zero (minimum value of truth).

Subsequently, the DC electrode (the DC electrode 106a in this case) of which the beam reception power P1 varies so as to be reduced by gradually adjusting the DC electrode 106a of the MZ-A 102 and the DC electrode 106b of the MZ-B 103 is selected. Subsequently, the beam reception power P1 is set to the minimum value of truth by adjusting the elected DC electrode 106a again (third step). At this time, the large intensity of the output beam of the MZ-A 102 is attenuated by the adjusting of the phase difference by the DC electrode 106a to be adjusted to the intensity of the output beam of the MZ-B 103. As a result, the component of frequency $f_0$ becomes zero and the beam having the components of frequencies $f_{+1}$ and $f_{-1}$ is output from the optical modulation unit 10, thereby realizing a high extinction ratio of an ON state to an OFF state in the modulation of the modulation signal $f_m$.

After the controlling is performed in the first to third steps, a phase of the output beam of the respective Mach-Zehnder optical waveguides may varies with time elapsed because of variation in ambient temperature, for example. In order to correct the variation in the ambient temperature, the optical modulation can be realized with higher precision by repeatedly performing the controlling in the second and third steps constantly or at regular intervals.

In this embodiment, the beam having components of frequencies $f_0$, $f_{+1}$, and $f_{-1}$ which is output from the optical modulation unit 10 is monitored; the beam reception power P2 of the entire frequencies is measured by the second optical detector 14b while the beam reception power P1 of the component of frequency $f_0$ filtered by the filter unit 13 is measured by the first optical detector 14a; and the phase difference applied by the DC electrodes of the Mach-Zehnder optical wavelengths MZ-A, MZ-B, and MZ-C of the optical modulation unit 10 is controlled on the basis of the beam reception powers P1 and P2. The controlling is performed by setting the beam reception power P1 to the minimum value and the beam reception power P2 to the maximum value. In this way, the controlling of the phase difference can be performed while performing the modulation process to optimize the extinction ratio. Accordingly, a high extinction ratio can be reliably obtained in real time even while the optical modulation device 1 practically operates in an optical communication system.

Second Embodiment

In the first embodiment, the controlling is performed using the beam reception power P1 of the component of frequency $f_0$ and the beam reception power P2 of the entire components of frequencies. However, instead of the beam reception power P2 of the entire components of frequencies, the controlling may be performed using a beam reception power P3 of the components of frequencies $f_{+1}$ and $f_{-1}$.

According to a second embodiment, an optical modulation device 2 has a structure shown in FIG. 5.

In FIG. 5, a monitor beam extracted by the monitor beam extracting unit 11 is input to a division unit 18 to be divided into two beams: a beam having the component of frequency $f_0$ and a beam having the components of frequencies $f_{+1}$ and $f_{-1}$. A beam reception power P1' of the former beam is measured by a third optical detector 14c and a beam reception power P3 of the latter beam is measured by a fourth optical detector 14d. In this embodiment spectra of the beams input by the optical detectors are shown in FIGS. 6A and 6B.

The control unit 17 of the optical modulation device 2 controls a modulation process of the optical modulation unit 10 on the basis of the beam reception powers P1' and P3. In the controlling, the DC electrodes 106a, 106b, and 104 are adjusted so that the beam reception power P1' of the third optical detector 14c becomes a minimum value and the beam reception power P3 of the fourth optical detector 14d becomes a maximum value. A difference from the first embodiment is that the beam reception powers P1' and P3 are used instead of the beam reception powers P and P2. In addition, a detailed control sequence is the same as the above-described sequence.

The division unit 18 functions as dividing the input beam (which has the components of frequencies $f_0$, $f_{+1}$, and $f_{-1}$) into the beam having the component of frequency $f_0$ and the beam having the components of frequencies $f_{+1}$ and $f_{-1}$. Specifically, for example, the optical circulator 131 and the fiber bragg grating 132 described above are combined to realize a desired function (in this case, one pair is configured unlike the filter unit 13). By using a generally used optical element capable of selecting a wavelength, the beam having the component of frequency $f_0$ is reflected (or transmitted) and the beam having the components of frequencies $f_{+1}$ and $f_{-1}$ is transmitted (or reflected), so that the optical circulator extracts the reflected beam.

The embodiments of the invention have been described with reference to the drawings. However, the detailed configuration is not limited to the above-described configurations, but may be modified in various forms without departing the gist of the invention.

For example, the single modulation frequency $f_m$ generated by the above-described modulation signal generating unit 15 is used to perform the modulation process by the optical modulation unit 10. However, even when a data signal to be transmitted is generated by the modulation signal generating unit 15 the data signal is used to perform the modulation process, a high extinction ratio can be realized in the same control manner.

The detail configuration is not limited as long as the filter unit 13 includes an element having an optical filter function based on a known technique. For example, a dielectric multiplayer filter or the like which uses interference by multiple films may be applied.

When automatic control is not necessary, the control unit 17 may manually operate.

As a light source of the laser beam input to the optical modulation unit 10, for example, there is used a DFB laser which is stably controlled with wavelength precision $<\pm 1$ GHz and beam output power precision $<\pm 0.1$ dB. Accordingly, a satisfactory result can be obtained.

INDUSTRIAL APPLICABILITY

According to the invention, it is possible to provide an optical modulation device which can stably realize a high extinction ratio while performing a modulation process by modulation signals.

The invention claimed is:

1. An optical modulation device comprising:
an optical modulation unit in which first and second sub-Mach-Zehnder optical waveguides are formed in two arms of a main Mach-Zehnder optical waveguide supplied with a beam having a frequency $f_0$, and in which a first phase difference adjusting member adjusts an intensity of respective output beams passing through the sub-Mach-Zehnder optical waveguides by applying a phase difference to the beam passing through both arms of at least one of the sub-Mach-Zehnder optical waveguides, a second phase difference adjusting member applies a phase difference of a bias to the respective beams passing through the two arms of the main Mach-Zehnder optical waveguide, and a modulation member modulates a frequency of the beam into a modulation frequency $f_m$ to output a beam having a component of frequency $f_{+1} = f_0 + f_m$ and a component of frequency $f_{-1} = f_0 - f_m$ from the main Mach-Zehnder optical waveguide;
a division unit which divides the output beam of the optical modulation unit into two beams;

a filter unit which extracts the component of frequency $f_0$ from one divided beam;

a first optical detector which measures a beam reception power of the filtered beam having the component of frequency $f_0$; and a second optical detector which measures a beam reception power of the other divided beam having the components of frequencies $f_0$, $f_{+1}$, and $f_{-1}$, wherein in the optical modulation unit, the first and second phase difference adjusting members are controlled so that the beam reception power measured by the first optical detector becomes a minimum value and the beam reception power measured by the second optical detector becomes a maximum value.

2. The optical modulation device according to claim 1, wherein the first phase difference adjusting member allows the phase difference of the beam having a stronger intensity and passing through the both arms of the sub-Mach-Zehnder optical waveguide to be different to attenuate the intensity of the beam, so that the intensities of the output beams passing through the two sub-Mach-Zehnder optical waveguides become equal to each other.

3. The optical modulation device according to claim 1, wherein the second phase difference adjusting member adjusts the beam passing through the two arms of the main Mach-Zehnder optical waveguide so that the phase difference of the beam is $\pi$.

4. The optical modulation device according to claim 1, wherein the optical modulation unit sequentially performs:

a first step of setting the beam reception powers of the first and second optical detectors to be a maximum value together;

a second step of controlling the second phase difference adjusting member so that the beam reception power of the first optical detector becomes a minimum value; and a third step of controlling the first phase difference adjusting member so that the beam reception power of the first optical detector more decreases.

5. The optical modulation device according to claim 1, wherein the Mach-Zehnder optical waveguides are formed on a board having an electro-optical effect, and wherein the first and second phase difference adjusting members and the modulation member are formed of electrodes applying an electric field to the Mach-Zehnder optical waveguides.

6. An optical modulation device comprising:

an optical modulation unit in which first and second sub-Mach-Zehnder optical waveguides are formed in two arms of a main Mach-Zehnder optical waveguide supplied with a beam having a frequency $f_0$, and in which a first phase difference adjusting member adjusts an intensity of respective output beams passing through the sub-Mach-Zehnder optical waveguides by applying a phase difference to the beam passing through both arms of at least one of the sub-Mach-Zehnder optical waveguides, a second phase difference adjusting member applies the phase difference of a bias to the beam passing through the two arms of the main Mach-Zehnder optical waveguide, and a modulation member modulates a frequency of the beam into a modulation frequency $f_m$ to output a beam having a component of frequency $f_{+1}=f_0+f_m$ and a component of frequency $f_{-1}=f_0-f_m$ from the main Mach-Zehnder optical waveguide;

a division unit which divides the output beam of the optical modulation unit into a beam having the frequency $f_0$ and a beam having the components of frequencies $f_{+1}$ and $f_{-1}$;

a third optical detector which measures a beam reception power of the beam having the component of frequency $f_0$; and a fourth optical detector which measures a beam reception power of the beam having the components of frequencies $f_{+1}$ and $f_{-1}$, wherein in the optical modulation unit, the first and second phase difference adjusting members are controlled so that the beam reception power measured by the third optical detector becomes a minimum value and the beam reception power measured by the fourth optical detector becomes a maximum value.

\* \* \* \* \*